(12) United States Patent
Alba

(10) Patent No.: US 12,026,993 B2
(45) Date of Patent: Jul. 2, 2024

(54) TRAILER DIAGNOSTIC AND MONITORING SYSTEM

(71) Applicant: Christopher M. Alba, Orlando, FL (US)

(72) Inventor: Christopher M. Alba, Orlando, FL (US)

(*) Notice: Subject to any disclaimer, the term of this patent is extended or adjusted under 35 U.S.C. 154(b) by 477 days.

(21) Appl. No.: 17/316,269

(22) Filed: May 10, 2021

(65) Prior Publication Data

US 2021/0350638 A1 Nov. 11, 2021

Related U.S. Application Data

(60) Provisional application No. 63/022,486, filed on May 9, 2020.

(51) Int. Cl.
| | |
|---|---|
| *G07C 5/08* | (2006.01) |
| *B60C 23/00* | (2006.01) |
| *B60C 23/04* | (2006.01) |
| *B60D 1/24* | (2006.01) |
| *B60D 1/62* | (2006.01) |
| *G01K 13/08* | (2006.01) |

(52) U.S. Cl.
CPC .......... *G07C 5/0808* (2013.01); *B60C 23/009* (2013.01); *B60C 23/0447* (2013.01); *B60C 23/0486* (2013.01); *B60D 1/24* (2013.01); *B60D 1/62* (2013.01); *G01K 13/08* (2013.01); *G07C 5/0825* (2013.01)

(58) Field of Classification Search
CPC .. G07C 5/0808; G07C 5/0825; B60C 23/009; B60C 23/0447; B60C 23/0486; B60D 1/24; B60D 1/62; G01K 13/08
See application file for complete search history.

(56) References Cited

U.S. PATENT DOCUMENTS

2021/0061027 A1* 3/2021 Da Deppo ............ B60C 23/041

* cited by examiner

*Primary Examiner* — Michael D Lang
(74) *Attorney, Agent, or Firm* — Jason T. Daniel, Esq.; Daniel Law Offices, P.A.

(57) ABSTRACT

A trailer diagnostic and monitoring system includes a system controller having a controller body, and a power unit for engage a wiring harness of the trailer. A location identification unit and wireless communication device are positioned within the controller body, and a plurality of hub sensor assemblies are positioned along the axle hubs of the trailer. Each of the assemblies including functionality for monitoring and reporting the temperature of a respective axle hub, and the pressure of the trailer tire secured to the respective axle hub. A process specific serial forwarder device communicatively links each of the hub sensor assemblies to the system controller. A trailer diagnostic and monitoring application for execution on a remote computing device includes functionality for communicating with the wireless communication device to receive trailer location information, tire pressure readings and axle hub temperatures.

14 Claims, 7 Drawing Sheets

TRAILER DIAGNOSTIC AND MONITORING SYSTEM

CROSS-REFERENCE TO RELATED APPLICATIONS

This application claims the benefit of U.S. Application Ser. No. 63/022,486 filed on May 9, 2020, the contents of which are incorporated herein by reference.

TECHNICAL FIELD

The present invention relates generally to sensors and systems for use with vehicular trailers, and more particularly to a trailer diagnostic and monitoring system.

BACKGROUND

The statements in this section merely provide background information related to the present disclosure and may not constitute prior art.

When towing a trailer such as a boat trailer, utility trailer (open or enclosed), livestock trailer and/or cargo trailer, for example, it can be difficult for the vehicle driver to adequately monitor the trailer during travel. In many cases, the driver only becomes aware of an issue with the trailer such as damage caused by overheating the axle hub(s) and/or a blowout, for example, after it has occurred.

In addition to the above, trailer theft is becoming one of the fastest growing instances of vehicular crime, as the number of trailers stolen each year continues to rise. As such, trailer owners must worry about their trailers both during use and when they are not in use.

Although there are known types of tire pressure sensors which can detect and report the air pressure within a given tire, such systems are difficult to use on trailers due to their proximity from the tow vehicle. Moreover, such systems only work to alert a driver that the tire has lost pressure, and therefore do not help to prevent a situation in which the wheel bearings (located inside the axle hub) seize up from overheating, thus immobilizing the trailer. Likewise, known trailer alarms typically include a siren or other type of noise maker that helps to deter a criminal, but are often unable to notify the owner that the trailer is being moved, and also do nothing to help the owner track and locate the trailer if/when it has been stolen.

Accordingly, it would be beneficial to provide a trailer diagnostic and monitoring system that can alleviate these drawbacks and others.

SUMMARY OF THE INVENTION

The present invention is directed to a trailer diagnostic and monitoring system. One embodiment of the present invention can include a system controller having a controller body that is configured to be positioned along a vehicular trailer, and a power unit that is configured to engage a wiring harness of the trailer. A location identification unit and wireless communication device can be positioned within the controller body.

In one embodiment, a plurality of hub sensor assemblies can be positioned along the axle hubs of the trailer. Each of the assemblies can include functionality for monitoring and reporting the temperature of the respective axle hub, and the pressure of the trailer tire secured to the axle hub. A process specific serial forwarder device can be positioned along the trailer and can communicatively link each of the hub sensor assemblies to the system controller.

One embodiment of the system can include a trailer diagnostic and monitoring application having machine readable instructions for execution on a remote computing device. The application including functionality for communicating with the wireless communication device of the system controller to receive trailer location information and for receiving the reported tire pressure and axle hub temperatures.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
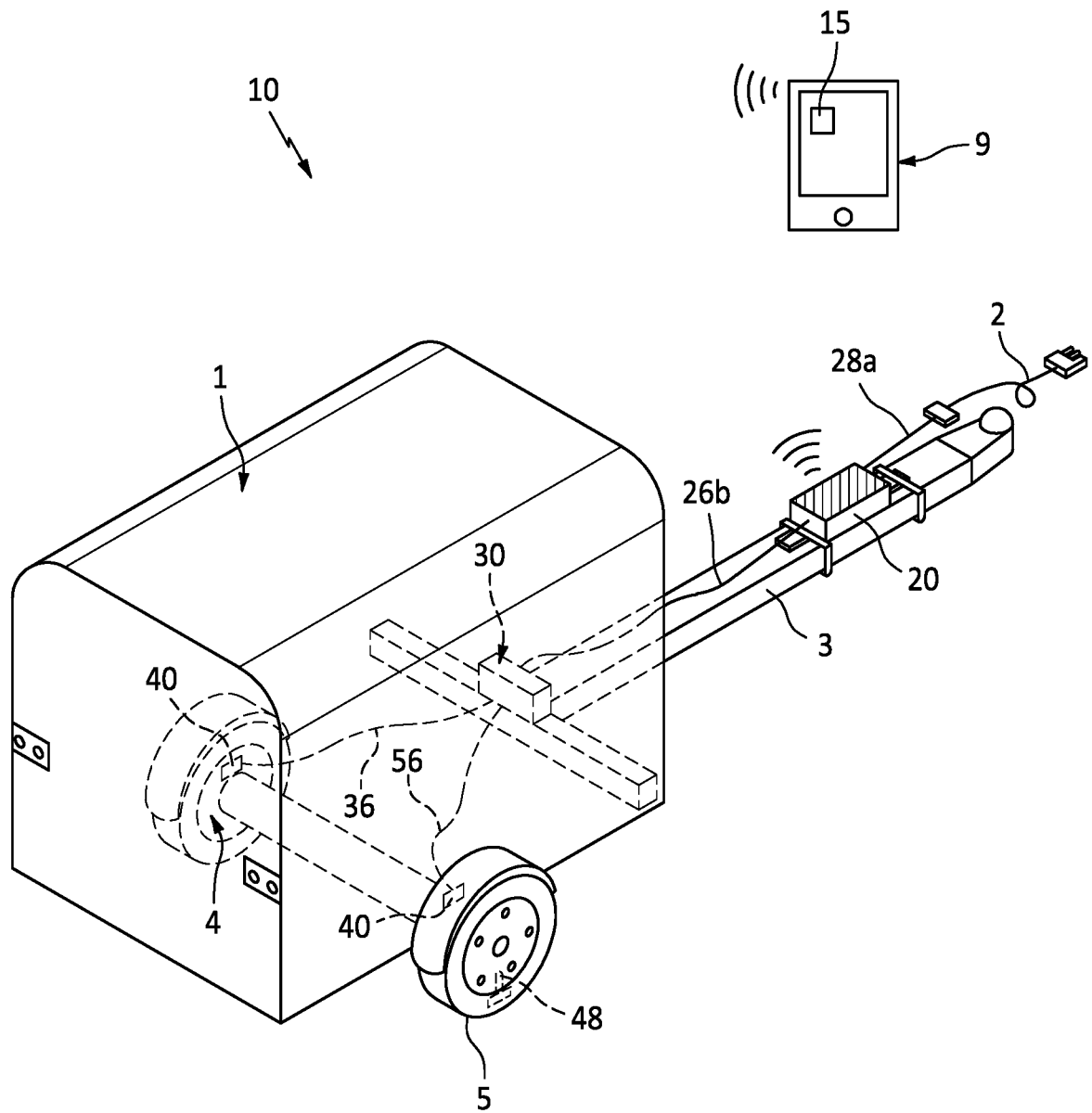
FIG. 1 is a perspective view of a trailer diagnostic and monitoring system that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described herein, the term "removably secured," and derivatives thereof shall be used to describe a situation wherein two or more objects are joined together in a non-permanent manner so as to allow the same objects to be repeatedly joined and separated.

As described herein, the term "connector" includes any number of different elements that work alone or together to repeatedly join two items together in a nonpermanent manner. Several nonlimiting examples include opposing strips of hook and loop material (i.e., Velcro®), attractively-oriented magnetic elements, flexible strips of interlocking projections with a slider (i.e., zipper), a thin, flexible strap with a notched surface and one end threaded through a locking mechanism (i.e., zip tie) at the other, tethers, buckles such as side release buckles, and compression fittings such as T-handle rubber draw latches, hooks, snaps and buttons, for example. Each illustrated connector and complementary connector can be permanently secured to the illustrated portion of the device via a permanent sealer such as glue, adhesive tape, or stitching, for example.

Although illustrated in the drawings with regard to a single axle utility trailer, this is for illustrative purposes only, as the term "trailer" can include, comprise or consist of any type of wheeled structure capable of being towed by a motor vehicle. Several nonlimiting examples of suitable trailers for use herein include, but are not limited to various light, medium, and heavy-duty utility trailers, gooseneck trailers, boat trailers, and/or flatbed trailers, for example, each having any number of axles and tires. Of course, other embodiments are contemplated wherein the system functionality can be imparted onto other types of trailers and/or motor vehicles, for example.

FIGS. 1-5 illustrate one embodiment of a trailer diagnostic and monitoring system 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As shown at FIG. 1, one embodiment of the trailer diagnostic and monitoring system 10 can be positioned along any type of trailer 1 and can include a remote application 15 that is in wireless communication with a system controller 20, at least one serial forwarder device 30, and a plurality of hub sensor assemblies 40, that are mounted onto the axle hubs 4 of the trailer.

Figure 2A:
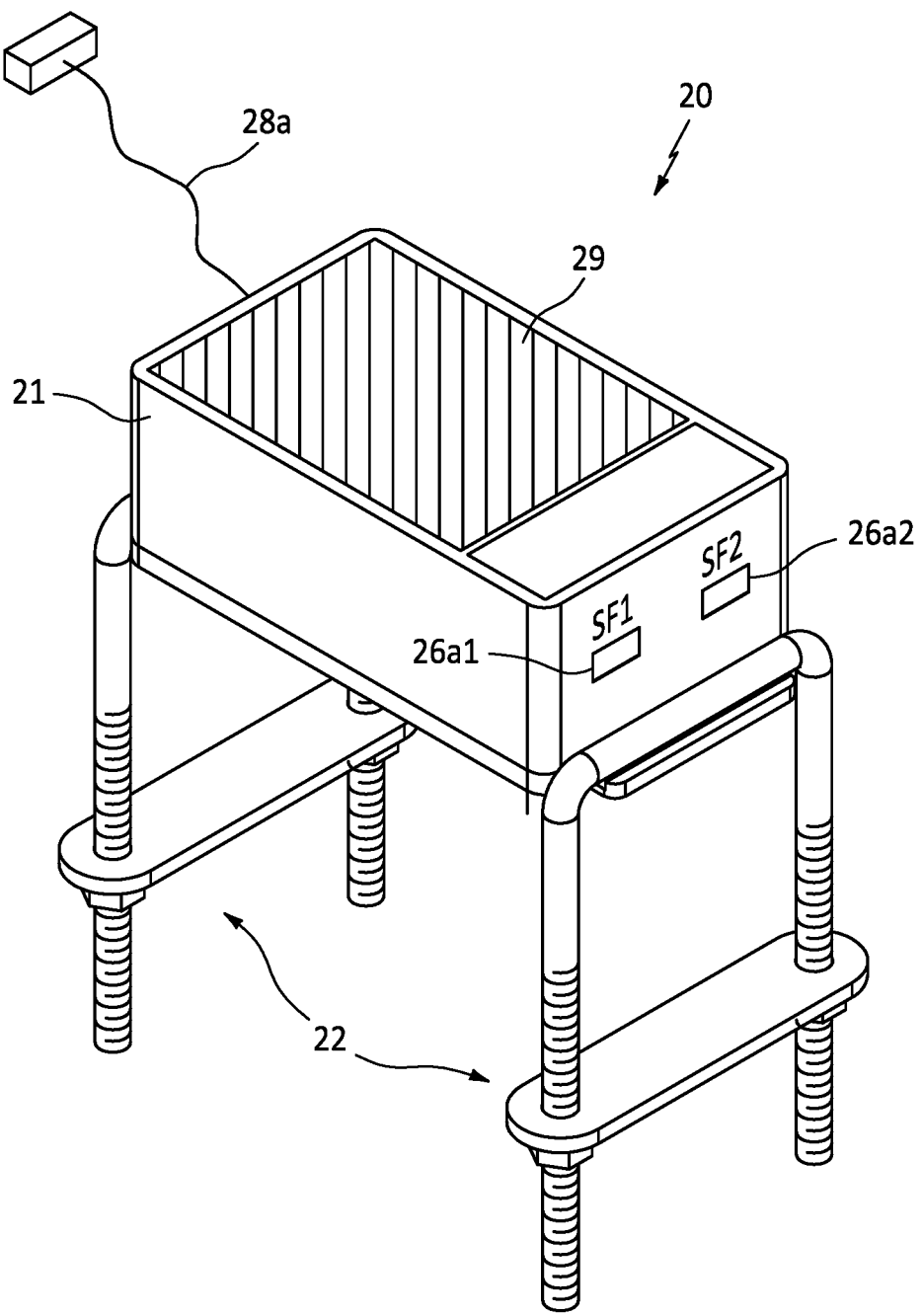
FIG. 2A is a perspective view of the system controller, in accordance with one embodiment of the invention.
Figure 2B:
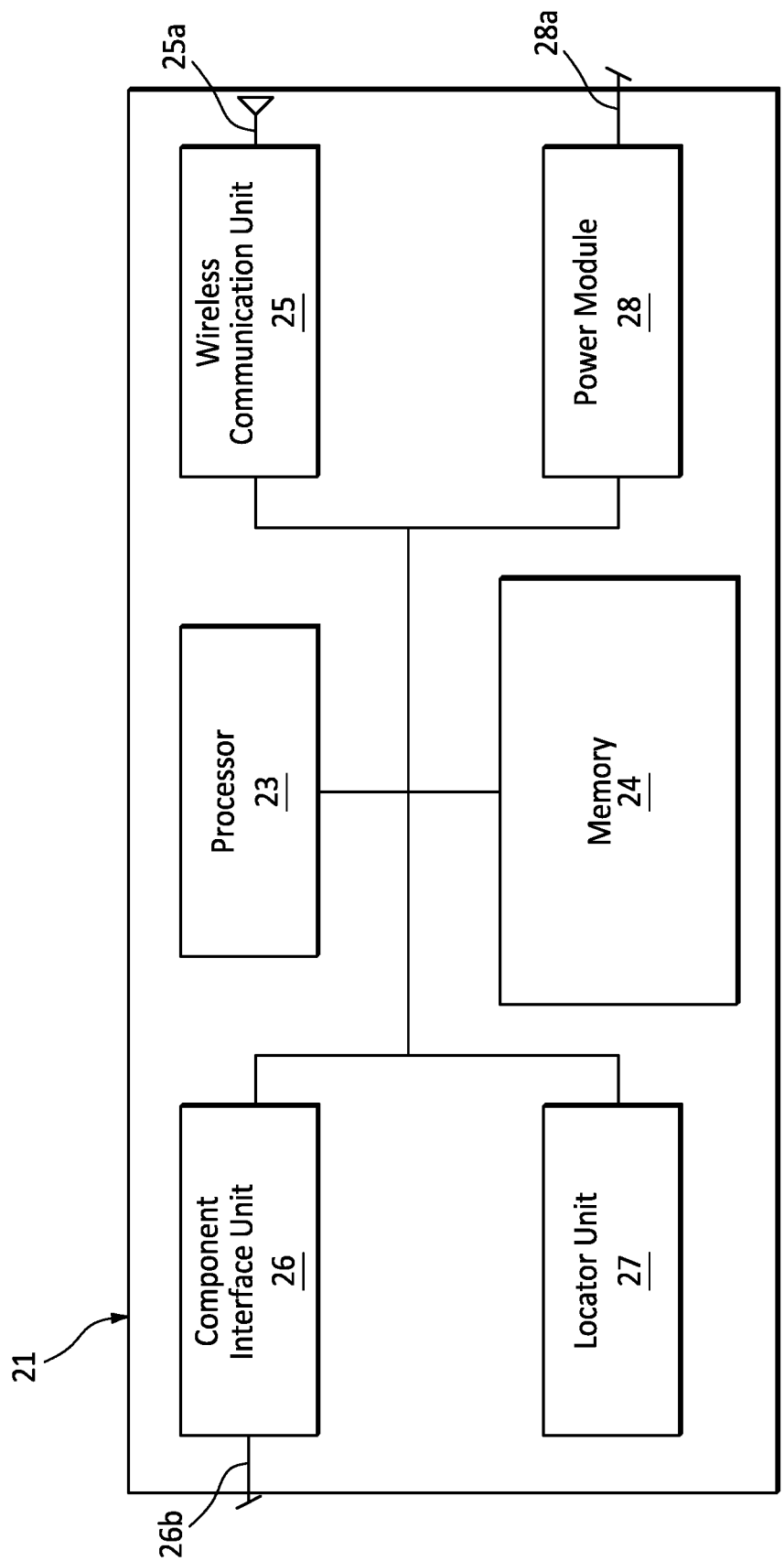
FIG. 2B is a simplified block diagram of the internal circuitry of the system controller, in accordance with one embodiment of the invention.

FIGS. 2A-2B illustrate one embodiment of the system controller 20, which can be in wireless communication with the remote application 15 and can be communicatively linked to the trailer wiring harness 2, the below described serial forwarder device(s) 30 and hub sensor assemblies 40.

In one embodiment, the system controller 20 can include an outer shell/main body 21 and mount 22, for housing a processor 23 that is conventionally connected to an internal memory 24, a wireless communication unit 25, a component interface unit 26, a location identification module 27, and a power module 28. Although illustrated as separate elements, those of skill in the art will recognize that one or more system components may comprise or include one or more printed circuit boards (PCB) containing any number of integrated circuit or circuits for completing the activities described herein. Of course, any number of other analog and/or digital components capable of performing the below described functionality can be provided in place of, or in conjunction with the below described controller elements.

The main body 21 can include any number of different shapes and sizes and can be constructed from any number of different materials suitable for encompassing each of the controller elements. In one preferred embodiment, the main body 21 can be constructed from various metals or metal alloys (e.g., aluminum, steel, titanium, or alloys thereof), forming a watertight interior space and having a plurality of internal connectors (not shown) for securely housing each of the device elements. Of course, any number of other known construction materials such as various plastic/polymers (e.g., high-density polyethylene (HDPE), rigid polyvinyl chloride (PVC), or polyethylene terephthalate (PET)), and/or composite materials (e.g., carbon fibers in a polymer matrix, fiberglass, etc.), are also contemplated.

The main body can preferably be connected along the tongue 3 of the trailer 1 via a mounting bracket 22 such as the illustrated U-bolt bracket assembly, for example. Of course, any number of other mounts/connectors capable of permanently or removably securing the main body 21 to any part of the trailer 1 are also contemplated.

The processor 23 can include one or more central processing units (CPU) or any other type of device, or multiple devices, capable of manipulating or processing information such as program code stored in the memory 24 in order to allow the device to perform the functionality described herein.

Memory 24 can act to store operating instructions in the form of program code for the processor 23 to execute. Although illustrated in FIG. 2B as a single component, memory 24 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device such as a solid-state hard drive, for example.

The wireless communication unit 25 can include any number of discrete or integrated components capable of sending and/or receiving electronic signals with another device, either directly or over a network. In one preferred embodiment, the communication unit 25 can include a cellular transceiver having an antenna 25a for communicating wirelessly with a remotely located user interface device such as the smartphone 9 running a mobile application 15 illustrated at FIG. 1, for example. Such a feature allowing the controller 20 to send and receive information with a user via the interface device.

Of course, the communication unit is not limited to the use of a cellular transceiver, as any number of other transmission and reception mechanisms and protocols can also be utilized herein. Several nonlimiting examples include radio, WiFi, Bluetooth, and the like, for example. Moreover, although described for communicating with external devices, other embodiments are contemplated wherein the communication unit 25 can also communicate with other system components.

As described herein, the mobile application 15 (i.e., trailer diagnostic and monitoring application) can be any set of programmatic instructions that can be loaded onto any type of processor enabled device such as the illustrated smartphone 9, personal computer, laptop, or smartwatch, for example. The App can include program language for execution on the device that enables a user of the device to interact with the controller 20 in order to receive information from the system components and/or to send operating instructions thereto. Although not illustrated, the app 15 can be communicatively linked to a database where such information can be uploaded, stored and accessed.

Several nonlimiting examples of information that can be sent and received includes but is not limited to: operating instructions from the user to the controller, tire pressure information, tire temperature information, hub temperature information, trailer location and tracking information, and/or any other type of information relating to, or captured by the system components.

The component interface unit 26 can function to provide a communicative link between the processing unit 23 and various system elements such as serial forwarder device(s) 30 and the hub sensor assemblies 40, for example. In this regard, the component interface unit can include any number of different components such as one or more PIC microcontrollers, bus cables, and/or cable connectors 26a1 and 26a2 (e.g., com port, USB port), among other types of known communication hardware capable of engaging any number of communication cables 26b in order to link the controller 20 to each of the serial forwarder device(s).

Although illustrated with regard to external plugs for engaging cables, other embodiments are contemplated wherein each cable 26b is hard wired to the controller 20. Of course, any other means for providing the two-way communication between the system components can also be utilized herein.

The location identification module 27 can function to provide real time location information (e.g., address, GPS coordinates, etc.) of the trailer 1 to which the system is attached at all times. In one embodiment, the location module can comprise a discrete GPS signal antenna, and transceiver for communicating with a third-party location tracking company that provides tracking and/or retrieval services for registered GPS enabled devices. Such a feature providing the user with options for establishing a suitable geofence, and for receiving notifications if/when the trailer is moved out of the same.

Alternatively, or as a backup to the GPS, the location module 27 can utilize the cellular transceiver of the device to interact with the mapping and location services offered by the cellular provider, as is known in the art. In either instance, the captured location information can be determined, stored by the system memory and available to a user via the application at any time.

The power module 28, can function to receive, store and distribute power to each of the system components. In one embodiment, the power module can be connected 28a to the 12 v "hot" wire of the trailer wiring harness 2 in order to receive power from the vehicle towing the trailer. Once received, the module can distribute the power to each of the serial forwarders 30 and hub devices 40 via the communication cables 36. In one embodiment, the module can include an integrated battery in order to provide full or partial power to the system components when the trailer is not hooked up to a tow vehicle. More specifically, the battery can function to ensure continuous operation of the location identification module and wireless transceiver in order to allow the system to report its location and/or sensor data at all times.

In another embodiment, a solar panel 29 having any number of photovoltaic cells can be positioned along the main body 21 and electrically connected to the battery and/or power module. The solar panel functioning to maintain the battery at a charge level suitable for continued operation in the manner described herein.

Figure 3A:
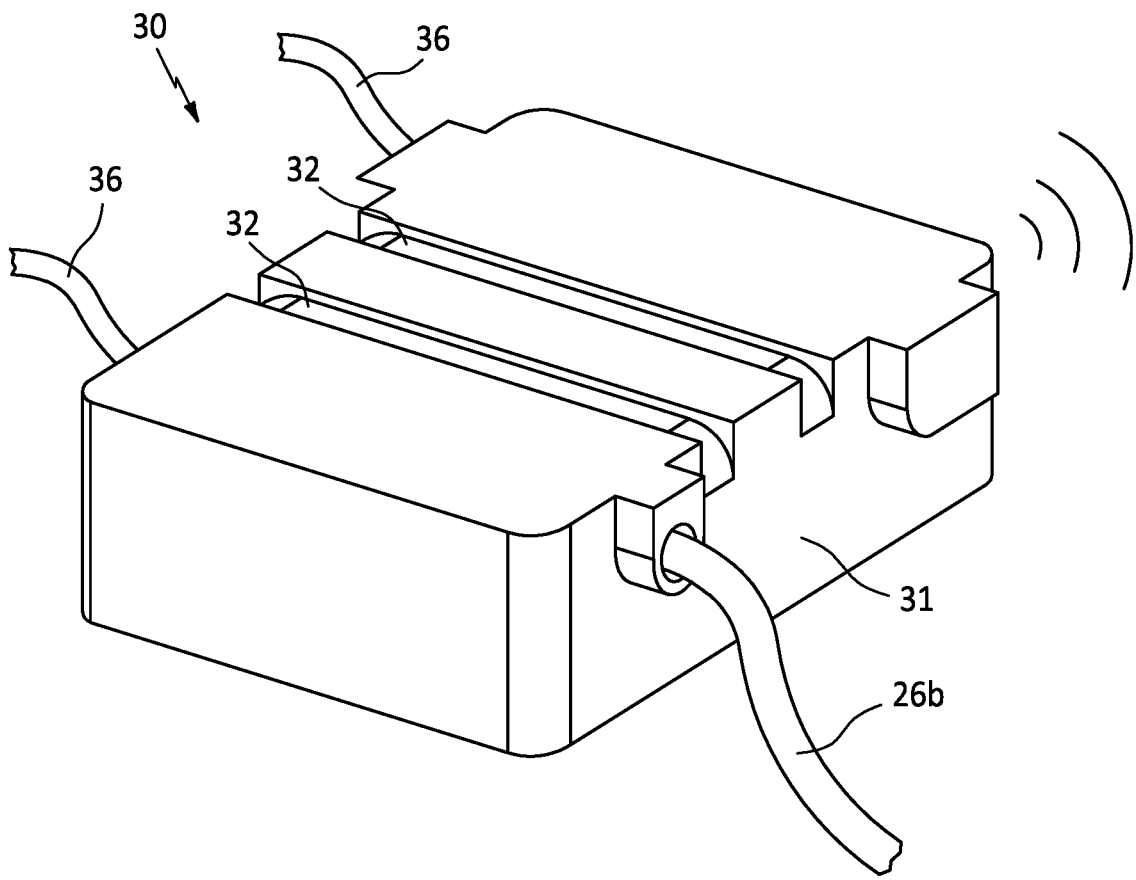
FIG. 3A is a perspective view of the serial forwarder device, in accordance with one embodiment of the invention.
Figure 3B:
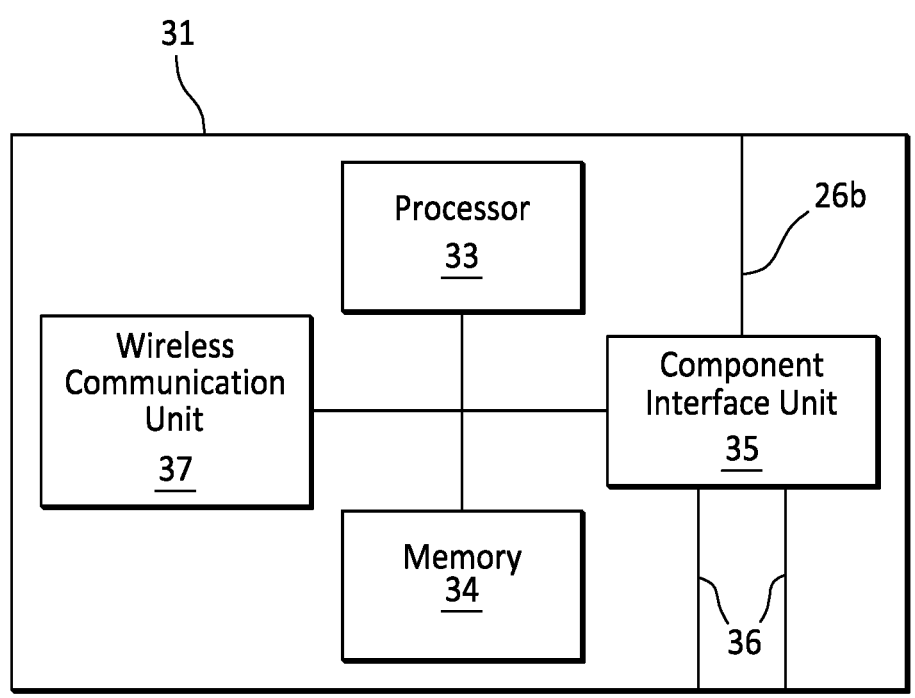
FIG. 3B is a simplified block diagram of the internal circuitry of the serial forwarder device, in accordance with one embodiment of the invention.

FIGS. 3A and 3B illustrate one embodiment of a serial forwarder device 30. In one embodiment, the serial forwarder device 30 can be a process specific local coordination device that is optimized to translate and facilitate communication and power between a specific sensor or group of sensors (e.g., hub sensor assemblies 40) and the system controller 20. To this end, the device 30 can receive information from the sensor assemblies 40 and send the same to the controller 20. Likewise, the device 30 can receive operating instructions and power from the controller 20 and can send corresponding instructions to the sensor assemblies 40 in the same language or a different language specific to the sensors, along with power necessary to operate the same.

The inclusion of a process specific local coordination device advantageously reduces processing demand on the controller 20 thus preventing signal lag.

In one embodiment, the serial forwarder device 30 can include an outer shell/main body 31, for housing a processor 33 that is conventionally connected to an internal memory 34, a component interface 35, and a local wireless communication unit 37.

Because the serial forwarder device is intended to be positioned close to the sensor assemblies 40, and may be submerged at times, it is preferred that the main body 31 be reinforced to prevent damage from water intrusion. As such, in one preferred embodiment, the main body 31 can be constructed from a metallic material as described above with regard to main body 21, or can be constructed from a hardened and reinforced plastic material with each of the device components 33-35 and 37 being potted therein via a potting compound, as is known in the art. Of course, any number of other types of materials and waterproofing components are also contemplated.

In the preferred embodiment, the main body 31 can include a plurality of channels 32 for receiving trailer mounting connectors such as zip ties, for example, however any number of other type connectors capable of mounting the main body 31 onto the trailer in either a permanent or removable manner are also contemplated.

As described herein, the processor 33 and memory 34 can be identical or substantially identical to the processor 23 and memory 24 described, therefore a duplicate explanation of the same is not provided.

The serial forwarder interface unit 35 can function to receive and facilitate communication between the communication cable 26b from the controller 20, and each of the dedicated communication cables 36 that are connected to each of the hub sensor assemblies 40. In the preferred embodiment, each of the cables 26b and 36 can terminate within the main body 31 so as to maintain the watertight integrity of the device. Of course, other embodiments are contemplated wherein the cables can be removably connected and where the interface unit 35 includes identical components and functionality as those described above with regard to interface unit 26.

The local wireless communication unit 37 can include any number of components capable of sending and/or receiving electronic signals with an externally located device, either directly or over a network. In one embodiment, the communication unit 37 can include a Bluetooth transceiver for communicating wirelessly with the below described tire pressure sensors 48 associated with each of the hub sensor assemblies 40. Of course, any number of other known transmission and reception mechanisms and protocols can also be utilized herein, several nonlimiting examples include radio transceivers, WiFi transceivers, and/or Near-Field-Communication (NFC) devices, among others, for example.

Figure 4A:
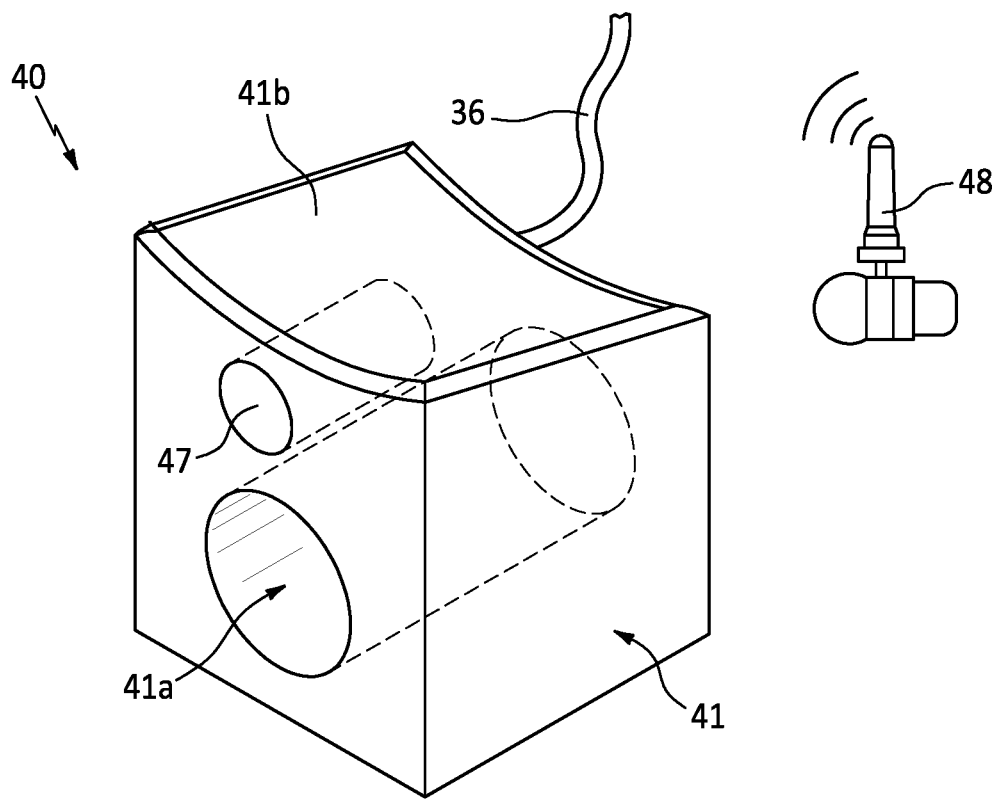
FIG. 4A is a perspective view of one of the hub sensor assemblies, in accordance with one embodiment of the invention.
Figure 4B:
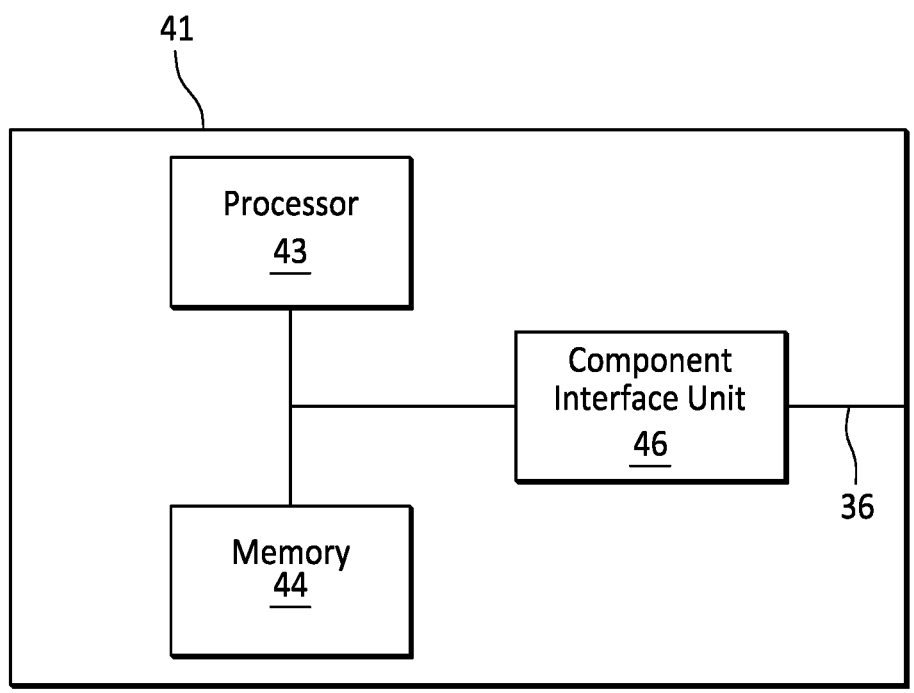
FIG. 4B is a simplified block diagram of the internal circuitry of one of the hub sensor assemblies, in accordance with one embodiment of the invention.
Figure 4C:
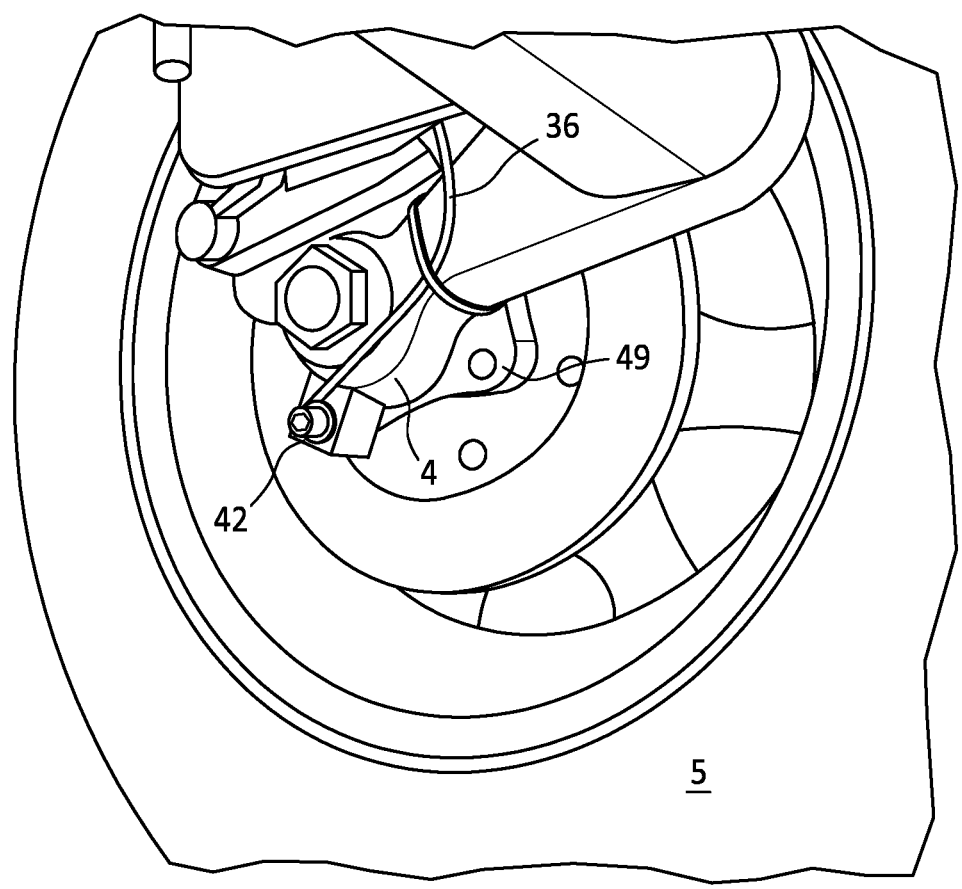
FIG. 4C is a perspective view of one of the hub sensor assemblies secured onto the axle hub of a trailer, in accordance with one embodiment of the invention.

FIGS. 4A-4C illustrate one embodiment of a hub sensor assembly 40. As described herein, the hub sensor assemblies can function to detect and report the temperature of each of the trailer's axle hubs 4, along with the tire pressure of each of the trailer's tires 5. In the illustrated embodiment, two hub sensor assemblies 40 are provided for the single axle of the trailer 1; however, dual axle trailers would have four sensors, three axle trailers would have six sensors, and so on.

Each sensor assembly 40 can be in direct communication with the serial forwarder 30 via one of the cables 36, and information collected by the assembly can be sent to the controller 20 from the serial forwarder. Likewise, operating instructions received by the controller 20 can be sent to each assembly 40 via the serial forwarder 30.

In one embodiment, each of the hub sensor assemblies 40 can include a main body 41, that houses a processor 43 that is conventionally connected to an internal memory 44, a component interface 46, and a temperature sensor 47. Each assembly can also include a wireless tire pressure sensor 48 that communicates wirelessly with the serial forwarder 30.

As described herein, the main body 41 can include any number of different shapes and sizes and can preferably be constructed from a rugged material such as metal or metal alloys; however, any number of other materials as described above with regard to housings 21 or 31 (e.g., potting) are also contemplated.

In one embodiment, the main body 41 can include an aperture 41a extending therethrough, for receiving an elongated bolt/nut connector 42. As shown, the connector 42 can engage an unused opening along the brake caliper mount 4a of the hub and spindle assembly 4 so as to position the curved upper surface of the main body 41b directly against the curvature of the hub and spindle assembly itself. Such a feature beneficially places the temperature sensor 47 directly against the metallic body of the hub and spindle assembly in order to accurately measure the temperature of the same.

Such a feature is important, because overheating of the hub and spindle components while traveling at speed results in the associated wheel seizing up (e.g., stop turning), thus causing a catastrophic failure which immediately immobilizes the trailer and is likely to cause a vehicular accident.

Of course, the main body is not limited to such an arrangement, as any number of other shapes are contemplated, along with any number of other types of connectors capable of mounting the main body 41 onto the body of the hub and spindle assembly of the trailer in either a permanent or removable manner are also contemplated.

As described herein, the processor 43 and memory 44 can also be identical or substantially identical to the processor 23 and memory 24 described above, therefore a duplicate explanation of the same is not provided.

The component interface 46 can function to receive and facilitate communication with the communication cable 36 from the serial forwarder 30. In the preferred embodiment, cable 36 can terminate within the main body 41 so as to maintain the watertight integrity of the device. Of course, other embodiments are contemplated wherein the cable can be removably connected and where the interface unit 46 includes identical components and functionality as those described above with regard to interface unit 26.

The temperature sensor 47 can be positioned along or within the main body 41 and can function to accurately detect and measure the temperature of the axle hub and spindle assembly 4. In one embodiment, the sensor 47 can include, comprise or consist of a thermocouple temperature sensor; however, any number of other types of temperature measuring devices are also contemplated.

The tire pressure sensor 48 can be secured along the trailer tire 5 of which the hub assembly 40 is associated and can function to detect the air pressure and/or temperature of the tire itself. Each tire pressure sensor can communicate directly with the wireless communication unit 37 of the serial forwarder 30. As described herein, the tire pressure sensor can include any number of commercially available tire pressure monitoring system sensors (TPMS) and can be either a direct or indirect sensor, as are known in the art. One example of a commercially available sensor for use herein includes the model QS104 universal TPMS sensor that is commercially available from QWIK-SENSOR, Inc. Of course, any number of other sensors are also contemplated.

In operation, the system components can be mounted onto any type of trailer as aftermarket components or as OEM components so as to be incorporated into the design and build of a new trailer and can be communicatively linked to the mobile application 15 in the manner described above. When driving the trailer, the system can actively monitor the tire pressure and hub temperatures and can automatically report the same to the application. In this regard, the application can include functionality for automatically sending an alert to the user—through the app, via text message, email, and/or voice call—if/when the temperature readings or tire pressure go outside of a given threshold. This threshold can be pre-populated within the app or can be user customizable.

For example, if the tire pressure goes below 25 psi, or if the hub temperature goes above 195 degrees ° F., the system could trigger the alert. Likewise, if the system detects that one of the tires/hubs has a reading that is out of sync with the other tire/hubs it can also trigger the alert. For example, if the trailer has 4 tires and one of the axle hubs is running 10 degrees hotter than all of the others, the alert can be sent.

Such features advantageously allow a user to monitor the health of the trailer at all times and take action before a tire blowout, overheat situation or catastrophic failure occurs.

Likewise, once the trailer has been parked, the battery and solar elements of the power module can keep the location identification module and wireless communication unit online. As such, a user can check the mobile application to see the location of the trailer at all times. Moreover, the mobile application can be encoded with a "PARKED" option wherein any movement of the trailer can trigger a movement alert which can be sent to the user in the same manner described above.

Such functionality, along with the geofence options described above allow a trailer owner to track and locate the trailer at any time.

Although described above with regard to a single serial forwarder device and a set of hub sensor assemblies, this is but one possible implementation of the system functionality. To this end, any number of additional sensor assemblies can be provided along or within a trailer and can be communicatively linked to the controller 20 either directly or via additional process specific serial forwarder devices.

Figure 5:
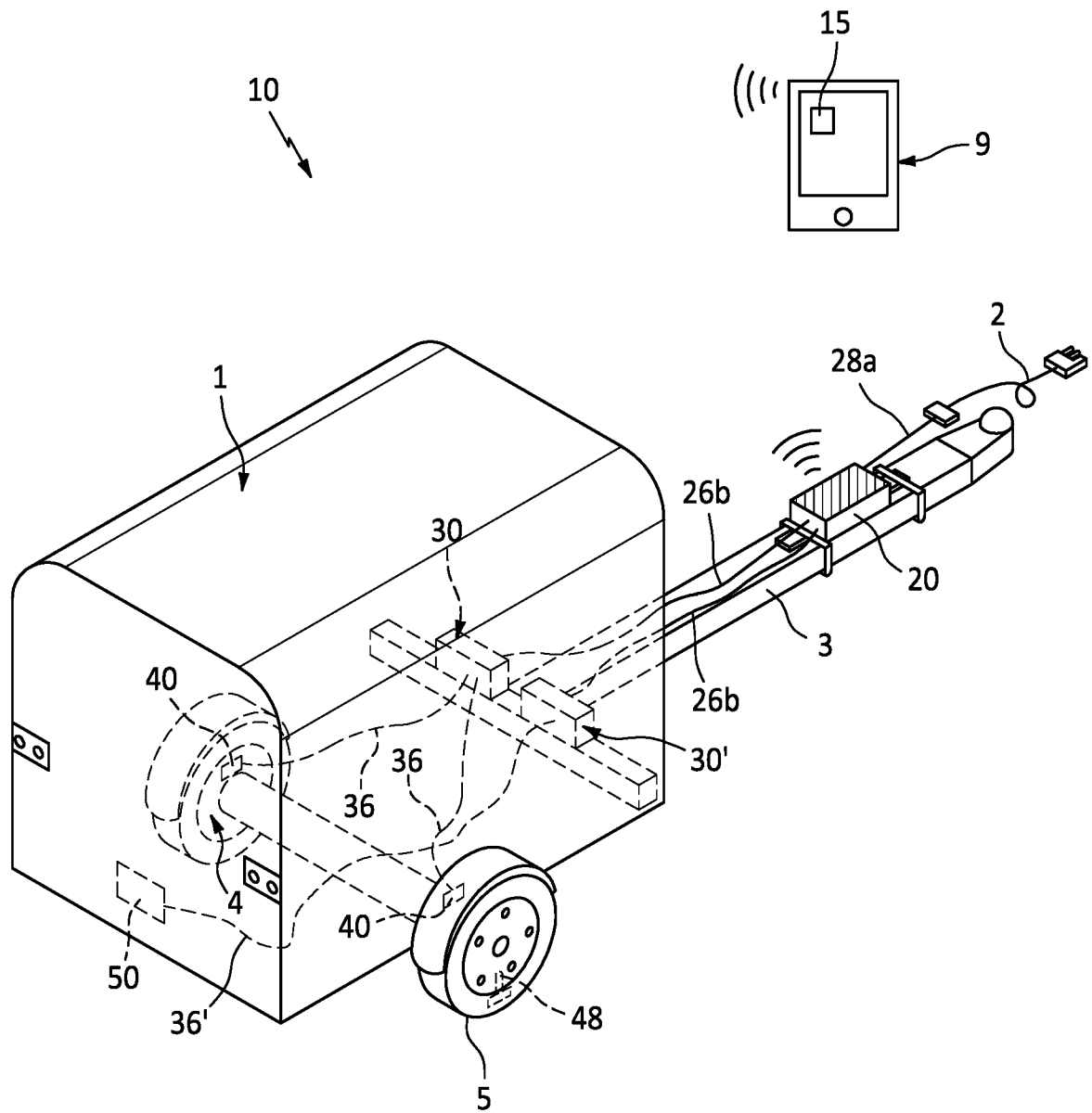
FIG. 5 is a perspective view of the trailer diagnostic and monitoring system in operation, in accordance with one embodiment of the invention.

To this end, FIG. 5 illustrates another embodiment of the trailer diagnostic and monitoring system 10 that further includes a second serial forwarder 30' that is in communication with a second sensor suite 50.

As described herein, the second serial forwarder 30' can be identical to the serial forwarder 30 described above and can be communicatively linked to the second sensor suite 50 via a communication cable 36' that is identical to cable 36 described above. The second sensor suite can include any number of different sensors for performing any number of different types of actions or functions. In various embodiments, the second sensor suite 50 can include, comprise, or consist of one or more devices and sensors such as ambient temperature sensors, fluid level sensors, proximity sensors, motion sensors, lock/unlock sensors and actuators, moisture sensors, acceleration sensors, orientation sensors, tilt sensors and water depth sensors/float switch sensors (used for boat trailer when backing down a boat ramp), among many others, for example.

Information and instructions for the second sensor suite 50 can be passed to and from the application 15 in the same manner described above with regard to hub sensors 40.

As described herein, one or more elements of the trailer diagnostic and monitoring system 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A trailer diagnostic and monitoring system, comprising:
    a system controller having a controller body that is configured to be positioned along a vehicular trailer, a power unit that is configured to engage a wiring harness of the trailer, and a wireless communication device that is positioned within the controller body, said wireless communication device including functionality for communicating with an external device;
    a serial forwarder device having a device body that is configured to be positioned along the trailer; and
    a plurality of hub sensor assemblies, that are communicatively linked to the system controller via the serial forwarder device,
    wherein each of the plurality of hub sensor assemblies are positioned adjacent to a tire of the trailer, and
    wherein the serial forwarder device functions to receive and distribute power from the system controller to the plurality of hub sensor assemblies, and to translate communications between the plurality of hub sensor assemblies and the system controller.

2. The system of claim 1, wherein each of the plurality of hub sensor assemblies further comprises:
    a main body having a curved top surface; and
    a hub connector for securing the curved top surface of the main body directly against a curved surface of a hub and spindle assembly on an axle of the trailer.

3. The system of claim 2, further comprising:
    a temperature sensor comprising a thermocouple that is positioned along the curved top surface of the main body, said temperature sensor being configured to directly measure a temperature of the hub and spindle assembly on the axle of the trailer.

4. The system of claim 3, further comprising:
    a wireless tire pressure sensor.

5. The system of claim 1, wherein the serial forwarder device includes a wireless transceiver, and said wireless transceiver includes functionality for communicating with a tire pressure monitoring sensor.

6. The system of claim 1, wherein each of the plurality of hub sensor assemblies includes a tire pressure monitoring sensor, and
    wherein the serial forwarder device includes a wireless transceiver,
    said wireless transceiver including functionality for communicating with the tire pressure monitoring sensor of each of the plurality of hub sensor assemblies.

7. The system of claim 6, wherein the wireless transceiver comprises:
    at least one of a Bluetooth transceiver or a radio transceiver.

8. The system of claim 1, wherein said communications includes at least one of a tire pressure and a hub and spindle assembly temperature that is reported from at least one of the plurality of hub sensor assemblies.

9. The system of claim 1, wherein said communications includes each of a tire pressure and a hub and spindle assembly temperature that is reported from at least one of the plurality of hub sensor assemblies.

10. The device of claim 1, further comprising:
    a trailer diagnostic and monitoring application, said application comprising machine readable instructions for execution on a computing device having a processor, a memory, and a display screen,
    wherein the application includes functionality for communicating with the wireless communication device of the system controller.

11. The device of claim 10, wherein the application includes functionality for receiving at least one of a tire pressure and a hub and spindle assembly temperature that is reported from at least one of the plurality of hub sensor assemblies.

12. The device of claim 10, wherein the application includes functionality for receiving each of a tire pressure and a hub and spindle assembly temperature that is reported from at least one of the plurality of hub sensor assemblies.

13. The device of claim 10, further comprising:
   a location identification unit that is positioned within the system controller body.

14. The device of claim 13, wherein the application includes functionality for receiving a location of the trailer to which the system controller body is secured.

\* \* \* \* \*